(12) United States Patent
Mun et al.

(10) Patent No.: US 11,513,381 B2
(45) Date of Patent: Nov. 29, 2022

(54) METHOD FOR MANUFACTURING OPTICAL DEVICE

(71) Applicant: LG Chem, Ltd., Seoul (KR)

(72) Inventors: In Ju Mun, Daejeon (KR); Kum Suek Seo, Daejeon (KR); Beom Jin Lee, Daejeon (KR); Byoung Kun Jeon, Daejeon (KR); Seong Min Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/041,895

(22) PCT Filed: May 16, 2019

(86) PCT No.: PCT/KR2019/005875
§ 371 (c)(1),
(2) Date: Sep. 25, 2020

(87) PCT Pub. No.: WO2019/221529
PCT Pub. Date: Nov. 21, 2019

(65) Prior Publication Data
US 2021/0132430 A1    May 6, 2021

(30) Foreign Application Priority Data

May 17, 2018   (KR) .................. 10-2018-0056286

(51) Int. Cl.
*G02F 1/1333* (2006.01)
*G02B 26/00* (2006.01)
(Continued)

(52) U.S. Cl.
CPC ..... *G02F 1/133305* (2013.01); *G02B 26/004* (2013.01); *G02F 1/139* (2013.01); *G02F 1/133528* (2013.01); *G02F 2202/28* (2013.01)

(58) Field of Classification Search
CPC ......... G02F 1/133305; G02F 1/133368; G02F 2201/56; G02F 1/133526; G06F 1/1652;
(Continued)

(56) References Cited

U.S. PATENT DOCUMENTS 5,273,475 A * 12/1993 Oshikawa ......... G02F 1/133305
445/24
2003/0134488 A1   7/2003 Yamazaki et al.
(Continued)

FOREIGN PATENT DOCUMENTS

JP    S59105614 A   6/1984
JP    H0618856 A    1/1994
(Continued)

OTHER PUBLICATIONS

Search report from International Application No. PCT/KR2019/0058785, dated Aug. 26, 2019.
(Continued)

*Primary Examiner* — Mariam Qureshi
(74) *Attorney, Agent, or Firm* — Lerner, David, Littenberg & Krumholz & Mentlik, LLP

(57) ABSTRACT

An optical device is provided. The optical device is capable of varying transmittance, and such optical device can be used for various applications such as eyewear, for example, sunglasses or AR (augmented reality) or VR (virtual reality) eyewear, an outer wall of a building or a sunroof for a vehicle.

17 Claims, 7 Drawing Sheets

(51) Int. Cl.
*G02F 1/1335* (2006.01)
*G02F 1/139* (2006.01)

(58) Field of Classification Search
CPC ............ G09G 2380/02; G02B 27/0955; H01L 51/5275
See application file for complete search history.

(56) References Cited

U.S. PATENT DOCUMENTS

| | | | |
|---|---|---|---|
| 2004/0090568 A1* | 5/2004 | Iijima | G02F 1/133553 349/65 |
| 2009/0091681 A1 | 4/2009 | Nishizawa et al. | |
| 2009/0185127 A1* | 7/2009 | Tanaka | G02F 1/13454 349/152 |
| 2009/0284904 A1* | 11/2009 | Wu | G02F 1/133305 361/679.01 |
| 2011/0120619 A1* | 5/2011 | Harada | B29C 66/81422 156/64 |
| 2012/0020056 A1 | 1/2012 | Yamagata et al. | |
| 2014/0226112 A1 | 8/2014 | Kim | |
| 2014/0340609 A1 | 11/2014 | Taylor et al. | |
| 2014/0345791 A1 | 11/2014 | Son et al. | |
| 2015/0168792 A1* | 6/2015 | Woo | G02F 1/1333 349/110 |
| 2015/0171354 A1 | 6/2015 | Lee et al. | |
| 2016/0091743 A1* | 3/2016 | Yu | G02F 1/1339 349/42 |
| 2017/0255033 A1* | 9/2017 | Kim | G09F 9/301 |
| 2018/0095265 A1* | 4/2018 | Chen | H01L 51/0096 |
| 2019/0012033 A1* | 1/2019 | Brandao Salgado | B32B 17/10036 |
| 2020/0201113 A1* | 6/2020 | Baierl | B32B 17/10302 |
| 2020/0333660 A1 | 10/2020 | Park et al. | |

FOREIGN PATENT DOCUMENTS

| | | |
|---|---|---|
| JP | 2009086560 A | 4/2009 |
| JP | 2009092884 A | 4/2009 |
| JP | 2010014901 A | 1/2010 |
| JP | 2010135802 A | 6/2010 |
| JP | 2012204419 A | 10/2012 |
| JP | 2014219508 A | 11/2014 |
| JP | 201783595 A | 5/2017 |
| KR | 20130026285 A | 3/2013 |
| KR | 101378913 B1 | 3/2014 |
| KR | 101449363 B1 | 10/2014 |
| KR | 20140139361 A | 12/2014 |
| KR | 20150069078 A | 6/2015 |
| KR | 20160008623 A | 1/2016 |
| WO | 2018199618 A1 | 11/2018 |

OTHER PUBLICATIONS

Extended European Search Report including Written Opinion for Application No. 19803127.0 dated May 25, 2021, pp. 1-13.

* cited by examiner

[Figure 1]
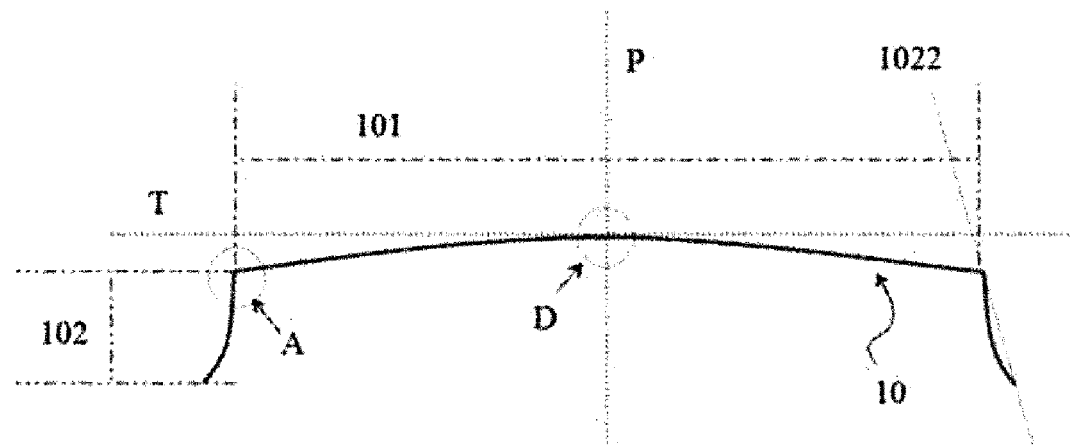
[Figure 2]
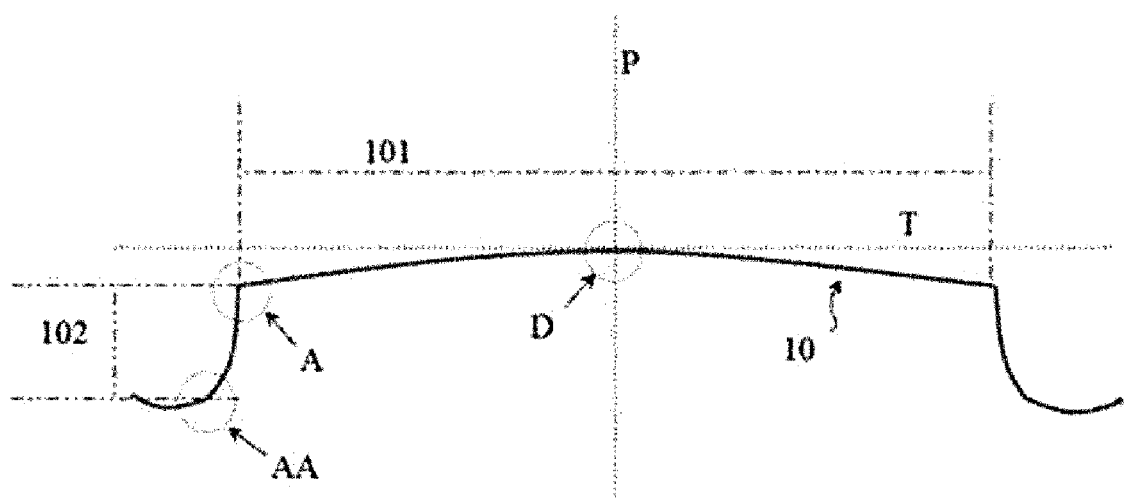

[Figure 3]
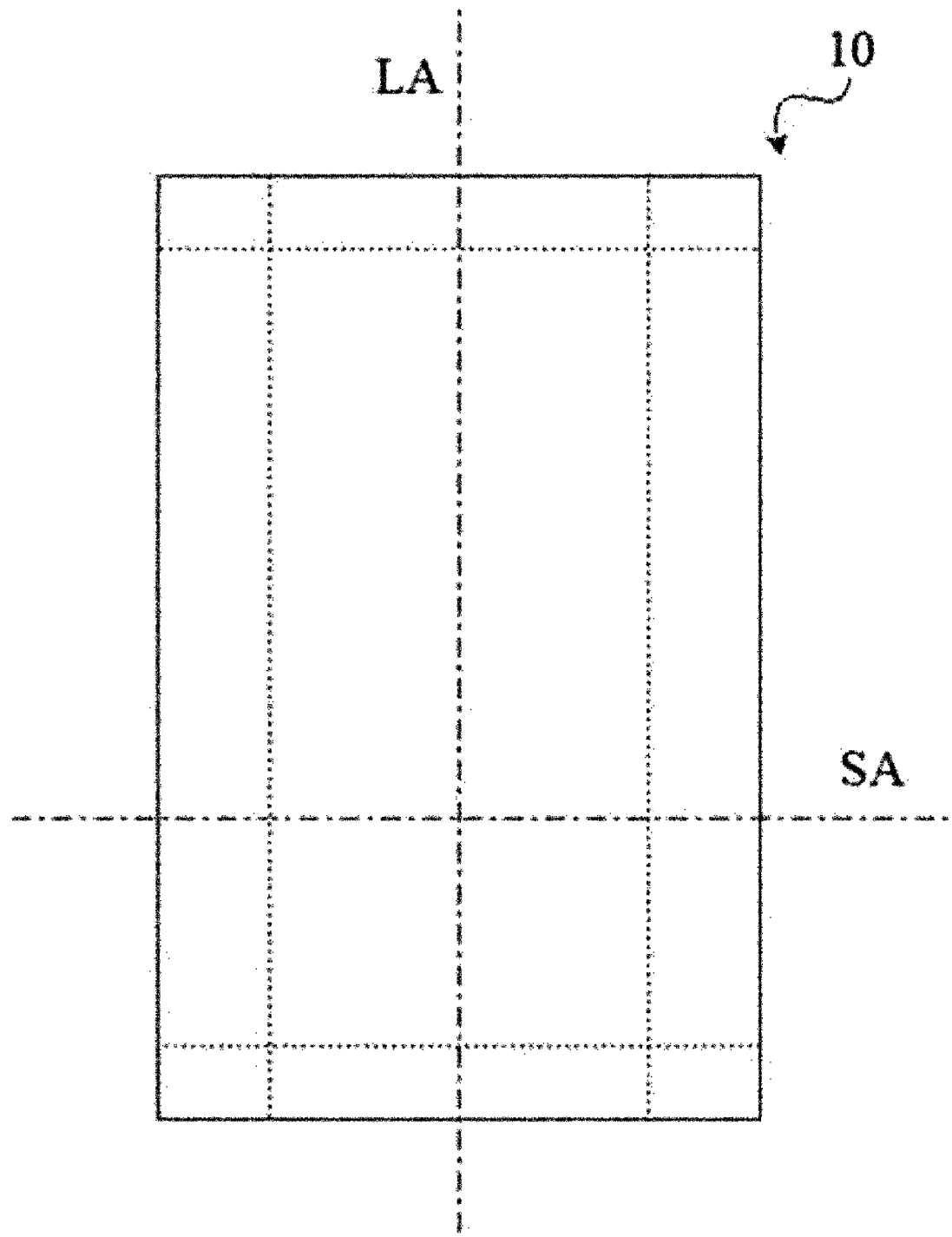

[Figure 4]
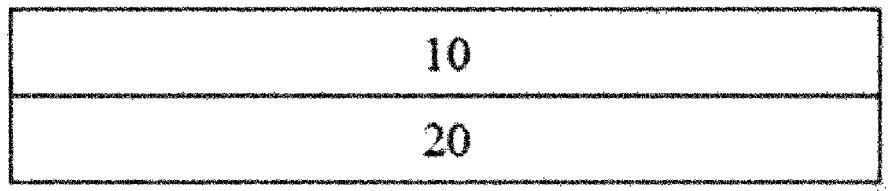
[Figure 5]
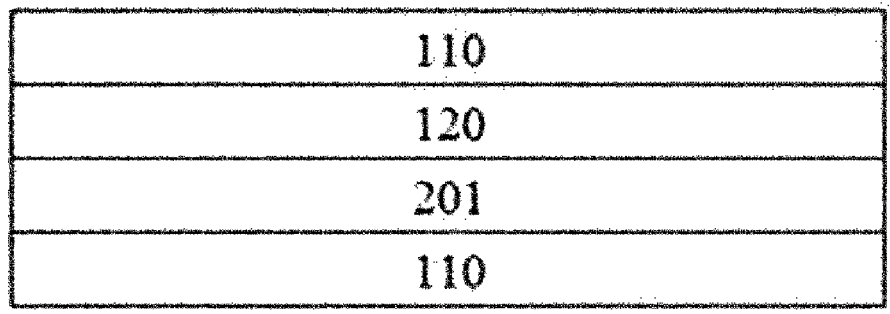
[Figure 6]
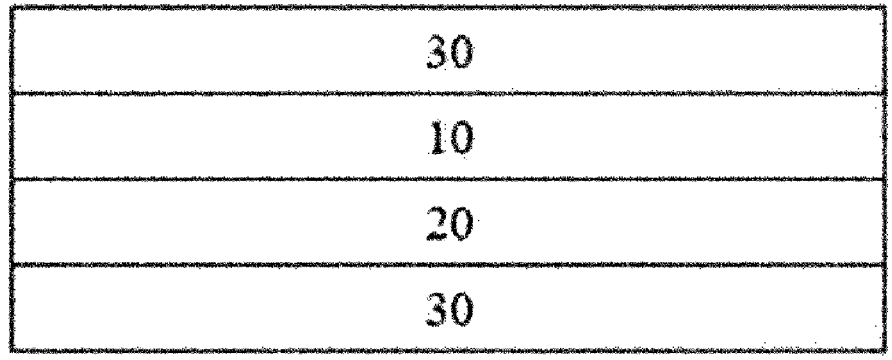

[Figure 7]
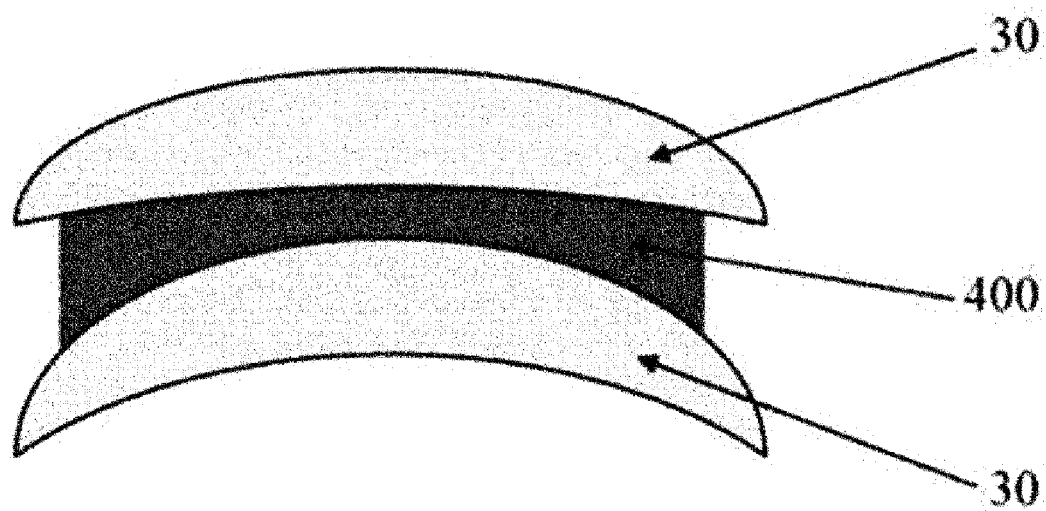
[Figure 8]
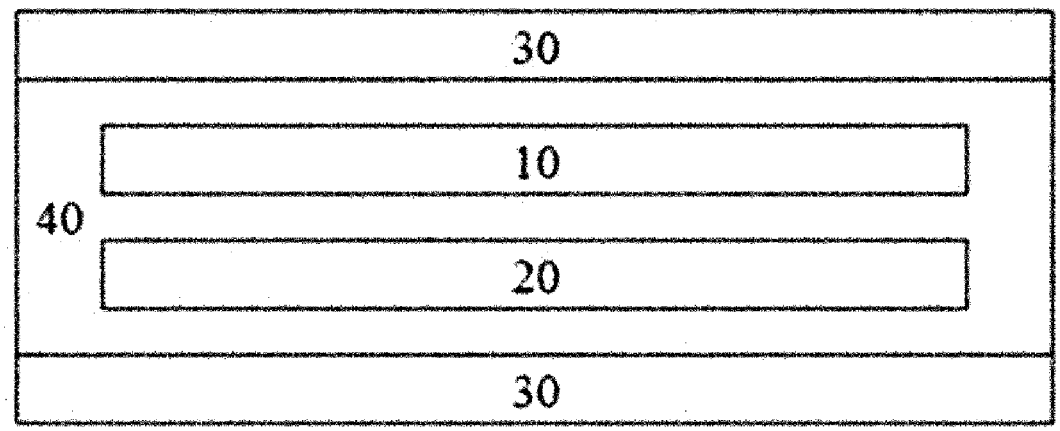

[Figure 9]
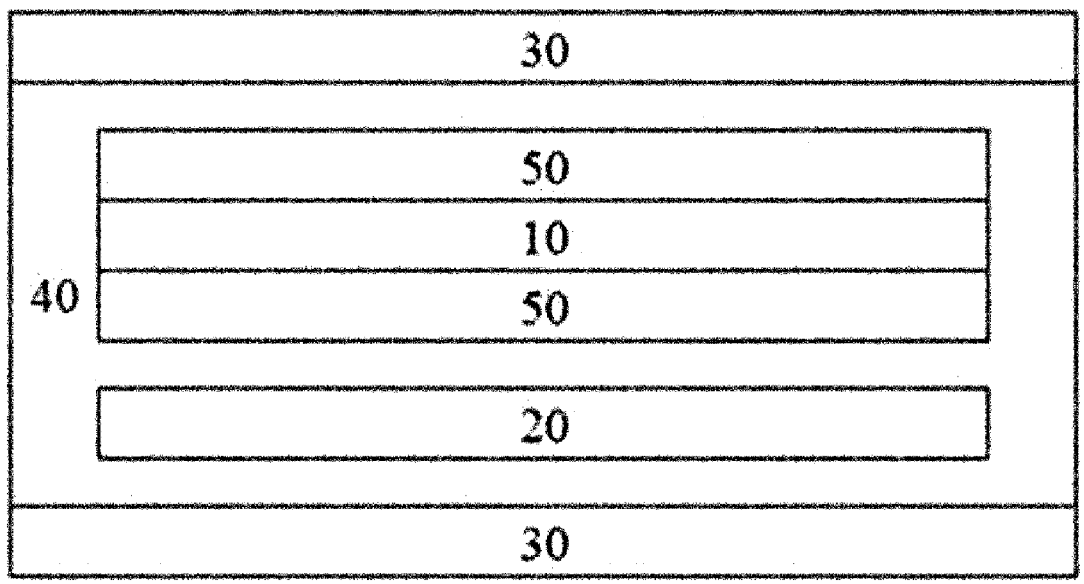
[Figure 10]
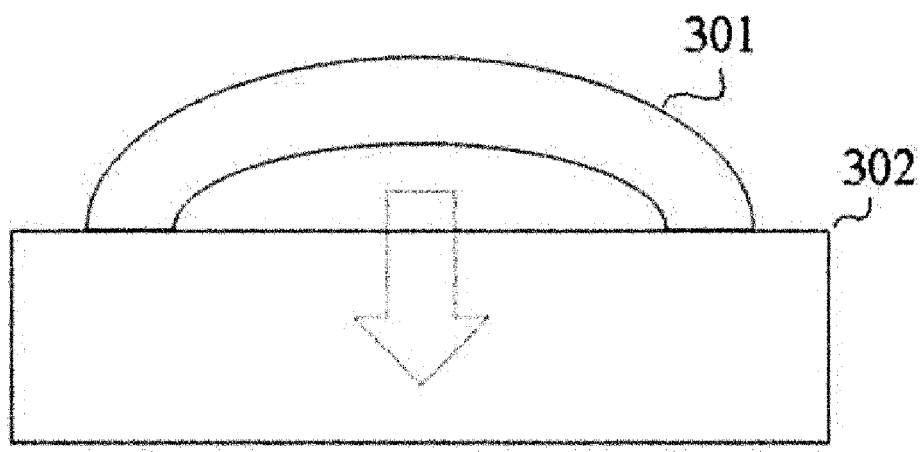

[Figure 11]
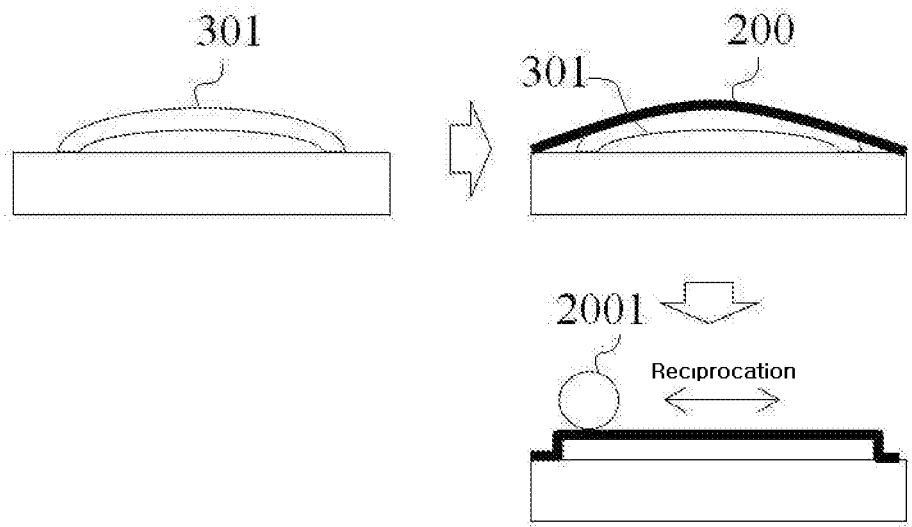
[Figure 12]
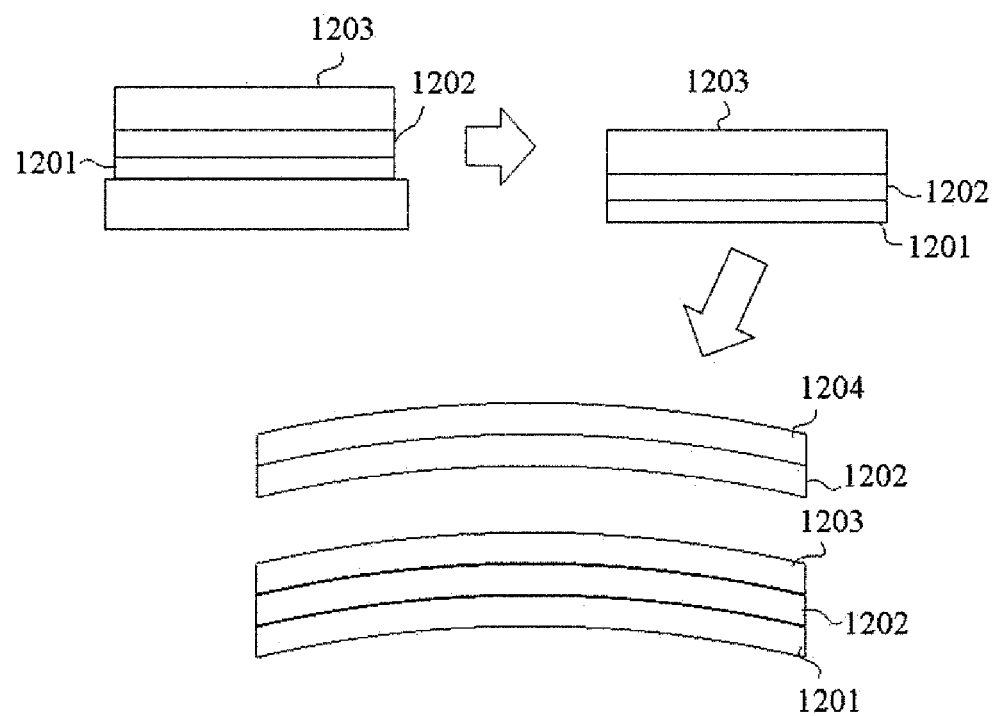

[Figure 13]
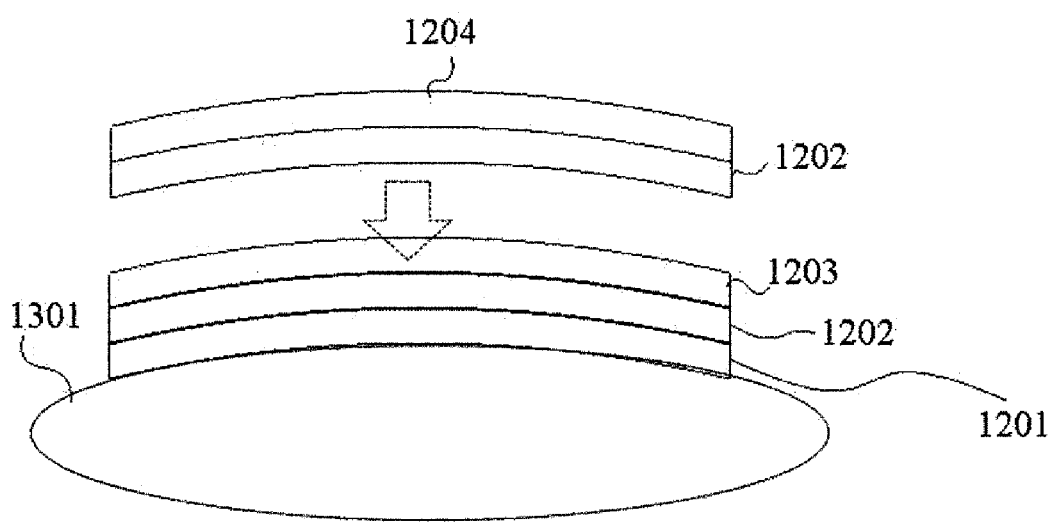

METHOD FOR MANUFACTURING OPTICAL DEVICE

CROSS-REFERENCE TO RELATED APPLICATION

This application is a national phase entry under 35 U.S.C. § 371 of International Application No. PCT/KR2019/005875 filed May 16, 2019 which claims priority from Korean Patent Application No. 10-2018-0056286 filed on May 17, 2018, the disclosure of which are incorporated herein by reference in their entirety.

TECHNICAL FIELD

The present application relates to an optical device.

BACKGROUND ART

Various transmittance-variable devices are known, which are designed so that transmittance can be varied using liquid crystal compounds. For example, variable transmittance devices using a so-called GH cell (guest host cell), to which a mixture of a host material and a dichroic dye guest is applied, are known. Such variable transmittance devices are applied to various applications including eyewear such as sunglasses and eyeglasses, outward walls of a building or sunroofs of a vehicle, and the like.

DISCLOSURE

Technical Problem

The present application provides a method for manufacturing an optical device. For application to certain uses including sunroofs and the like, it may be contemplated to encapsulate the transmittance-variable device between outer substrates, where such encapsulation may typically be performed by an autoclave process using an adhesive film. However, when a substrate formed in a curved surface shape as the outer substrate is used depending on the use, the encapsulation process is not properly performed or an effective encapsulation structure is not achieved even if it has been performed. For example, when the autoclave process is performed in a state where the curved surface-shaped substrate is applied, defects such as waves and wrinkles are generated in the device to be encapsulated, and such defects deteriorate the appearance quality of the device. Accordingly, it is one object of the present application to provide a method for manufacturing an optical device efficiently and stably, even when a curved surface substrate is applied as an encapsulated substrate, i.e., an outer substrate.

Technical Solution

The optical device manufactured by the present application is an optical device capable of adjusting transmittance, for example, an optical device capable of at least switching between a transparent mode and a black mode.

Advantageous Effects

The present application provides an optical device capable of varying transmittance, and such optical device can be used for various applications such as eyewear, for example, sunglasses or AR (augmented reality) or VR (virtual reality) eyewear, an outer wall of a building or a sunroof for a vehicle.

BRIEF DESCRIPTION OF DRAWINGS

FIGS. 1 to 3 are diagrams for explaining a folded structure of a liquid crystal element of the present application.
FIGS. 4 to 9 are illustrative diagrams for explaining an optical device of the present application.
FIGS. 10 to 13 are diagrams illustratively showing a manufacturing method of the present application.

DETAILED DESCRIPTION

Hereinafter, an optical device manufactured by the method of the present application will be described first.

The transparent mode of the optical device is a state where the optical device exhibits relatively high transmittance, and the black mode is a state where the optical device has relatively low transmittance.

In one example, the optical device may have transmittance in the transparent mode of about 30% or more, 35% or more, 40% or more, 45% or more, or about 50% or more. Also, the optical device may have transmittance in the black mode of about 20% or less, 15% or less, or about 10% or less.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, 95%, 90%, 85%, 80%, 75%, 70%, 65% or about 60%. The lower limit of the transmittance in the black mode may be about 0%, 1%, 2%, 3%, 4%, 5%, 6%, 7%, 8%, 9%, or about 10%.

The transmittance may be linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device manufactured by the method of the present application is designed to be capable of switching at least between the transparent mode and the black mode. If desired, the optical device may also be designed to be capable of implementing another mode other than the transparent mode and the black mode. For example, it may also be designed to be capable of implementing a third mode which may represent any transmittance between the transmittance of the transparent mode and the transmittance of the black mode.

The switching between such modes can be achieved, as the optical device comprises an active liquid crystal element. Here, the active liquid crystal element is a liquid crystal element capable of switching between at least two or more oriented states of light axes, for example, first and second oriented states. Here, the optical axis may mean the long axis direction when the liquid crystal compound included in the liquid crystal element is a rod type, and may mean the normal direction of the disc plane when it is a discotic type. For example, in the case where the liquid crystal element comprises a plurality of liquid crystal compounds whose directions of the optical axes are different from each other in any oriented state, the optical axis of the liquid crystal element may be defined as an average optical axis, and in this case, the average optical axis may mean the vector sum of the optical axes of the liquid crystal compounds.

The oriented state in such a liquid crystal element can be changed by applying energy, for example, by applying a voltage. For example, the liquid crystal element may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first state.

The liquid crystal element may comprise a liquid crystal layer containing at least a liquid crystal compound. In one example, the liquid crystal layer is a so-called guest host liquid crystal layer, which may be a liquid crystal layer comprising a liquid crystal compound and a dichroic dye guest.

The liquid crystal layer is a liquid crystal layer using a so-called guest host effect, which is a liquid crystal layer in which the dichroic dye guest is aligned according to a alignment direction of the liquid crystal compound (hereinafter, may be referred to as a liquid crystal host). The alignment direction of the liquid crystal host may be adjusted depending on whether or not external energy is applied.

The type of the liquid crystal host used in the liquid crystal layer is not particularly limited, and a general type of liquid crystal compound applied to realize the guest host effect may be used.

For example, as the liquid crystal host, a smectic liquid crystal compound, a nematic liquid crystal compound, or a cholesteric liquid crystal compound may be used. In general, a nematic liquid crystal compound may be used. The term nematic liquid crystal compound means a liquid crystal compound which has no regularity with respect to the position of the liquid crystal molecules but is capable of arranging all of them in the molecular axis direction, and such a liquid crystal compound may be in a rod form or may be in a discotic form.

As such a nematic liquid crystal compound, one having a clearing point of, for example, about 40° C. or more, 50° C. or more, 60° C. or more, 70° C. or more, 80° C. or more, 90° C. or more, 100° C. or more, or about 110° C. or more, or having a phase transition point in the above range, that is, a phase transition point to an isotropic phase on a nematic phase, can be selected. In one example, the clearing point or phase transition point may be about 160° C. or less, 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than about 3 or more than about 7, or may be less than about −2 or less than about −3.

The liquid crystal compound may also have optical anisotropy ($\Delta n$) of about 0.01 or more, or about 0.04 or more. In another example, the optical anisotropy of the liquid crystal compound may be about 0.3 or less, or about 0.27 or less.

Liquid crystal compounds that can be used as the liquid crystal host of the guest host liquid crystal layer are well known to those skilled in the art, whereby the liquid crystal compound can be freely selected from them.

The liquid crystal layer comprises a dichroic dye guest together with the liquid crystal host. The term "dye" may mean a material capable of intensively absorbing and/or modifying light in at least a part or the entire range in a visible light region, for example, a wavelength range of 380 nm to 780 nm, and the term "dichroic dye guest" may mean a material capable of absorbing light in at least a part or the entire range of the visible light region.

As the dichroic dye guest, for example, known dyes known to have properties that can be aligned according to the aligned state of the liquid crystal host may be selected and used. For example, azo dyes or anthraquinone dyes and the like may be used as the dichroic dye guest, and the liquid crystal layer may also comprise one or two or more dyes in order to achieve light absorption in a wide wavelength range.

A dichroic ratio of the dichroic dye guest can be appropriately selected in consideration of the purpose of using the dichroic dye guest. For example, the dichroic dye guest may have a dichroic ratio of about 5 or more to about 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The dichroic dye may have the dichroic ratio in at least any one wavelength, a certain range of wavelengths, or the full range of wavelengths in the wavelength range of the visible light region, for example, in the wavelength range of about 380 nm to about 780 nm or about 400 nm to about 700 nm.

The content of the dichroic dye guest in the liquid crystal layer may be appropriately selected in consideration of the purpose of using the dichroic dye guest. For example, the content of the dichroic dye may be selected in a range of 0.1 to 10 wt % based on the total weight of the liquid crystal host and the dichroic dye guest. The ratio of the dichroic dye may be changed in consideration of the desired transmittance and the solubility of the dichroic dye guest in the liquid crystal host, and the like.

The liquid crystal layer basically comprises the liquid crystal host and the dichroic dye guest, and may further comprise other optional additives according to a known form, if necessary. As an example of the additive, a chiral dopant or a stabilizer can be exemplified, without being limited thereto.

The liquid crystal layer may have an anisotropy degree (R) of about 0.5 or more. The anisotropy degree (R) is determined from absorbance (E(p)) of a light beam polarized parallel to the alignment direction of the liquid crystal host and absorbance (E(s)) of a light beam polarized perpendicularly to the alignment direction of the liquid crystal host according to the following equation.

<Anisotropy Degree Equation>

$$\text{Anisotropy degree }(R)=[E(p)-E(s)]/[E(p)+2*E(s)]$$

The above-used reference is another identical apparatus that does not contain a dye in the liquid crystal layer.

Specifically, the anisotropy degree (R) may be determined from the value (E(p)) for the absorbance of the liquid crystal layer in which the dye molecules are horizontally oriented and the value (E(s)) for the absorbance of the same liquid crystal layer in which the dye molecules are vertically oriented. The absorbance is measured in comparison with a liquid crystal layer which does not contain any dye at all but has the same constitution. This measurement may be performed, in the case of one vibration plane, using a polarized beam vibrating in a direction parallel to the alignment direction (E(p)) and vibrating in a direction perpendicular to the alignment direction (E(s)) in subsequent measurements. The liquid crystal layer is not switched or rotated during the measurement, and thus the measurement of E(p) and E(s) may be performed by rotating the vibration plane of the polarized incident light.

One example of a detailed procedure is as described below. The spectra for the measurement of E(p) and E(s) can be recorded using a spectrometer such as a Perkin Elmer Lambda 1050 UV spectrometer. The spectrometer is equipped with Glan-Thompson polarizers for a wavelength range of 250 nm to 2500 nm in both of the measuring beam and the reference beam. The two polarizers are controlled by a stepping motor and are oriented in the same direction. The change in the polarizer direction of the polarizer, for example, the conversion of 0 degrees to 90 degrees, is always performed synchronously and in the same direction with respect to the measuring beam and the reference beam. The orientation of the individual polarizers may be measured using the method described in T. Karstens' 1973 thesis in the University of Wurzburg.

In this method, the polarizer is rotated stepwise by 5 degrees with respect to the oriented dichroic sample, and the absorbance is recorded, for example, at a fixed wavelength in the maximum absorption region. A new zero line is executed for each polarizer position. For the measurement of two dichroic spectra E(p) and E(s), anti-parallel-rubbed test cells coated with polyimide AL-1054 from JSR are located in both of the measuring beam and the reference beam. Two test cells can be selected with the same layer thickness. The test cell containing a pure host (liquid crystal compound) is placed in the reference beam. The test cell containing a solution of a dye in the liquid crystals is placed in the measuring beam. Two test cells for the measuring beam and the reference beam are installed in a ray path in the same alignment direction. In order to ensure the maximum possible accuracy of the spectrometer, E(p) may be in its maximum absorption wavelength range, for example, a wavelength range of about 0.5 to about 1.5. This corresponds to transmittance of about 30% to about 5%. This is set by correspondingly adjusting the layer thickness and/or the dye concentration.

The anisotropy degree (R) can be calculated from the measured values of E(p) and E(s) according to the above equation as shown in a reference [see: "Polarized Light in Optics and Spectroscopy," D. S. Kliger et al., Academic Press, 1990].

In another example, the anisotropy degree (R) may be about 0.55 or more, 0.6 or more, or 0.65 or more. The anisotropy degree (R) may be, for example, about 0.9 or less, 0.85 or less, 0.8 or less, 0.75 or less, or about 0.7 or less.

Such an anisotropy degree (R) can be achieved by controlling the kind of the liquid crystal layer, for example, the kind of the liquid crystal compound (host), the kind and the ratio of the dichroic dye guest, or the thickness of the liquid crystal layer, and the like.

It is possible to provide an optical device with high contrast ratio by increasing the difference in the transmittance between the transparent mode and the black mode while using lower energy through the anisotropy degree (R) in the above range.

The thickness of the liquid crystal layer may be appropriately selected in consideration of the purpose, for example, the desired anisotropy degree or the like. In one example, the thickness of the liquid crystal layer may be about 0.01 µm or more, 0.05 µm or more, 0.1 µm or more, 0.5 µm or more, 1 µm or more, 1.5 µm or more, 2 µm or more, 2.5 µm or more, 3 µm or more, 3.5 µm or more, 4 µm or more, 4.5 µm or more, 5 µm or more, 5.5 µm or more, 6 µm or more, 6.5 µm or more, 7 µm or more, 7.5 µm or more, 8 µm or more, 8.5 µm or more, 9 µm or more, or about 9.5 µm or more. By controlling the thickness in this manner, it is possible to realize an optical device having a large difference in transmittance between the transparent mode and the black mode, that is, a device having a large contrast ratio. The thicker the thickness is, the higher the contrast ratio can be realized, and thus it is not particularly limited, but it may be generally about 30 µm or less, 25 µm or less, 20 µm or less, or about 15 µm or less.

In one example, the first and second oriented states may be each selected from a horizontal orientation, vertical orientation, twisted nematic orientation, or cholesteric orientation state. For example, in the black mode, the liquid crystal element or the liquid crystal layer may be at least in horizontal orientation, twisted nematic orientation or cholesteric orientation, and in the transparent mode, the liquid crystal element or liquid crystal layer may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as P-2000 from Jasco.

A method of realizing the liquid crystal element of the normally transparent mode or black mode by adjusting the dielectric constant anisotropy of the liquid crystal host or the alignment direction of the alignment film for orienting the liquid crystal host, and the like is known.

The liquid crystal element may comprise two base films disposed opposite to each other and the active liquid crystal layer existing between the two base films.

The liquid crystal element may further comprise spacers for maintaining an interval of the two base films between the two base films and/or a sealant for attaching the base films in a state where the interval of two base films disposed opposite to each other is maintained. As the spacer and/or the sealant, a known material can be used without any particular limitation.

As the base film, for example, an inorganic film made of glass or the like, or a plastic film can be used.

As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold; silver; or a silicon compound such as silicon dioxide or silicon monoxide, or a functional layer such as an antireflection layer may also be present on the base film, if necessary.

As the base film, a film having a phase difference in a predetermined range may be used. In one example, the base film may have a front phase difference of 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 5 nm or less, 4 nm or less, 3 nm or less, 2 nm or less, 1 nm or less, or about 0.5 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the base film may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or 0.5 nm or less, and may be 0 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

In this specification, the front phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences is about 550 nm.

Front phase difference $(Rin)=d\times(nx-ny)$ [Equation 1]

Thickness direction phase difference $(Rth)=d\times(nz-ny)$ [Equation 2]

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

In addition, the angle formed by the slow axis of the base film and a light absorption axis of a polarizer to be described below may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize the optically excellent and uniform transparent mode and black mode through the phase difference adjustment or the arrangement of the slow axes.

The base film may have a coefficient of thermal expansion of 100 ppm/K or less. In another example, the coefficient of thermal expansion may be about 95 ppm/K or less, 90 ppm/K or less, 85 ppm/K or less, 80 ppm/K or less, 75 ppm/K or less, 70 ppm/K or less, or about 65 ppm/K or less, or may be 10 ppm/K or more, 20 ppm/K or more, 30 ppm/K or more, 40 ppm/K or more, 50 ppm/K or more, or about 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of about 90% or more may be used. The elongation at break may be 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or about 175% or more, and may be about 1,000% or less, 900% or less, 800% or less, 700% or less, 600% or less, 500% or less, 400% or less, 300% or less, or about 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length).

By selecting the base film to have such a coefficient of thermal expansion and/or elongation at break, an optical device having excellent durability can be provided.

The thickness of the base film as above is not particularly limited, and for example, may be in a range of about 50 μm to about 200 μm or so.

In the liquid crystal element, a conductive layer and/or an alignment film may be present on one side of the base film, for example, on the side facing the active liquid crystal layer.

The conductive layer present on the side of the base film is a constitution for applying a voltage to the active liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the liquid crystal element in this field can be used.

In one example, an alignment film exists on the side of the base film. For example, a conductive layer may first be formed on one side of the base film, and an alignment film may be formed on its upper part.

The alignment film is a constitution for controlling orientation of the liquid crystal host included in the active liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base films disposed opposite to each other may form an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees to each other, or may be approximately parallel to each other. In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or may be approximately perpendicular to each other.

Since the direction of the optical axis of the active liquid crystal layer is determined in accordance with such an alignment direction, the alignment direction can be confirmed by checking the direction of the optical axis of the active liquid crystal layer.

The shape of the liquid crystal element having such a structure is not particularly limited, which may be determined according to the application of the optical device, and is generally in the form of a film or a sheet.

In one example, the liquid crystal element may have a folded form. For example, at the time of observing a cross-section, the active liquid crystal element may have a cross-section comprising a first line whose curvature (=1/curvature radius) is in a range of 0 to 0.01; a folded area at the end of the first line and a second line connected to the folded area. That is, the active liquid crystal element may be included in the optical device in the folded form in the folded area. In another example, the curvature may be about 0.009 or less, 0.008 or less, 0.007 or less, 0.006 or less, 0.005 or less, 0.004 or less, 0.003 or less, 0.002 or less, 0.001 or less, 0.0009 or less, 0.0008 or less, 0.0007 or less, 0.0006 or less, 0.0005 or less, 0.0004 or less, 0.0003 or less, 0.0002 or less, 0.0001 or less, 0.00009 or less, 0.00008 or less, 0.00007 or less, 0.00006 or less, or about 0.00005 or less.

As described below, the optical device of the present application may have a structure produced by placing the active liquid crystal element and/or a polarizer to be described below inside two outer substrates and vacuum-pressing them in a state where adhesive film are placed at the respective interfaces.

When such an optical device is exposed to high temperature, high humidity conditions, and the like, or in the process, defects such as wrinkles are formed on the liquid crystal element by the difference in coefficient of thermal expansion between the base film of the liquid crystal element and an adhesive film pressed thereto, and the like, such defects may affect adversely the performance of the optical device.

Thus, in the present application, it has been confirmed that the above problem can be solved when the active liquid crystal device is implemented with the folded structure.

FIG. 1 is a diagram schematically showing a cross-section of the active liquid crystal element (10) having the folded structure.

As in FIG. 1, the cross-section of the active liquid crystal element (10) may have a cross-section in the form in which a first line (101), a folded area (A) and a second line (102) are connected.

Here, the first line (101) may be an active area, that is, an area serving to modulate light in order to substantially control a light transmission state. Such a first line (101) may be a planar shape, which has a curvature of 0, or may also be a curved shape, such as a convex shape or a concave shape.

As shown in FIG. 1, the active liquid crystal element (10) has a folded structure based on the folded area (A), and thus a second line (102) is formed. At this time, the degree to which the second line (102) is folded is not particularly limited as long as it is controlled to such an extent that defects such as wrinkles of the active liquid crystal element (10) do not occur in the optical device. In one example, the degree of folding may be set such that the angle formed by the first line (101) or the tangent (T) of the first line (101) and the second line (102) is, in a clockwise or counterclockwise direction, more than about 0 degrees, 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, or about 60 degrees or more or so. In another example, the angle may be about 180 degrees or less, 170 degrees or less, 160 degrees or less, 150 degrees or less, 140 degrees or less, 130 degrees or less, or about 120 degrees or less or so. Here, the tangent at which the angle with the second line (102) is measured is a tangent at the point (D) which divides the first line (101) approximately by two. Also, the second line for measuring the angle for the tangent (T) may be a line (1022) connecting the folded area (A) to the point where the second line (102) is terminated, as shown in FIG. 1.

In such a form, the ratio (L1/L2) of the length (L1) of the first line (101) to the length (L2) of the second line (102) may be in a range of about 500 to about 4,000. In another example, the ratio (L1/L2) may be about 550 or more, 600 or more, 650 or more, 700 or more, 800 or more, 900 or more, 1000 or more, 1100 or more, 1200 or more, 1500 or more, 2000 or more, 2500 or more, 3000 or more, or 3500 or more, and may be 3500 or less, 3000 or less, 2900 or less, 2800 or less, 2700 or less, 2600 or less, 2500 or less, 2400 or less, 2300 or less, 2200 or less, 2100 or less, 2000 or less, 1,900 or less, 1,800 or less, 1,700 or less, 1,600 or less, 1,500 or less, 1,400 or less, 1,300 or less, 1,200 or less, 1,100 or less, 1,000 or less, 900 or less, or about 800 or less.

In such a relationship, the absolute lengths of the first line (101) and the second line (102) are not particularly limited, which may be determined according to the intended use of the optical device or the like. For example, the length of the first line (101) may be adjusted to be about 100 to about 1,000 mm or so. In another example, the length of the first line (101) may be about 150 mm or more, 200 mm or more, or about 250 mm or more. In another example, the length of the first line (101) may be about 900 mm or less, 800 mm or less, 700 mm or less, 600 mm or less, or about 500 mm or less.

Such a folded structure may be formed at both ends in the cross-section of the liquid crystal element. Accordingly, as in FIG. 1, the folded areas (A) and the second lines (102) may be formed at both ends of the first line (101) in the cross-section of the active liquid crystal element.

In such a structure, the second line may be further folded, and for example, as shown in FIG. 2, a second folded area (AA) exists on the second line (102), where the cross-section in the form that the second line (102) is further folded in the second folded area (AA) may be realized.

In this case, the forming position of the additionally formed second folded area (AA) is not particularly limited, and for example, the position may be adjusted so that the distance from the folded area (A) formed at the connecting portion of the first line (101) and the second line (102) to the second folded area (AA) formed on the second line (102) becomes L2 satisfying the above-mentioned ratio (L1/L2).

The cross-section of the liquid crystal element in which such a cross-section is observed is a cross-section observed when the liquid crystal element has been observed from any side. That is, the cross-section is preferably observed on any one side of the sides of the liquid crystal element.

In one example, the cross-section in which the folded structure is observed may be a cross-section on a normal plane formed by including the long axis or the short axis of the liquid crystal element. Here, for example, in the case where the active liquid crystal element (10) is observed from above, when it is the rectangular shape as in FIG. 3, the long axis may be the long side (LA) of horizontal and vertical lengths, and the short axis may be the short side (SA).

For example, the cross-sectional structure may be realized by folding a portion indicated by a dotted line in the active liquid crystal element (10) having the same structure as FIG. 3.

When the liquid crystal element has a square shape, any one of the horizontal axis and the vertical axis may be regarded as the long axis and the other may be regarded as the short axis.

Furthermore, in the case of a shape other than a rectangular shape, for example, in the case of an elliptical, circular or amorphous shape, and the like, when the liquid crystal element is observed from above, a line perpendicular to the line formed by the folded portion (for example, a dotted line in FIG. 3) may be any one of the short axis and the long axis, and a line which is again perpendicular to the line may be the other of the short axis and the long axis.

In one example, as shown in FIG. 3, all four sides of the liquid crystal element can be folded to form the cross-section, and in this case, the cross-section may be observed on both the normal plane including the long axis of the liquid crystal element and the normal plane including the short axis.

Although the position of the above-mentioned sealant in the liquid crystal element having the folded structure as above is not particularly limited, generally, the sealant attaching the two base films may exist in the folded area (A in FIGS. 1 and 2) or an area facing from the folded area (A in FIGS. 1 and 2) toward the first line (101).

The optical device further comprises a polarizer together with the active liquid crystal element. As the polarizer, for example, an absorbing linear polarizer, that is, a polarizer having a light absorption axis formed in one direction and a light transmission axis formed approximately perpendicular thereto may be used.

Assuming that the blocking state is implemented in the first oriented state of the active liquid crystal layer, the polarizer may be disposed in the optical device such that the angle formed by an average optical axis (vector sum of optical axes) of the first oriented state and the light absorption axis of the polarizer is about 80 degrees to about 100 degrees or about 85 degrees to about 95 degrees, or it is approximately perpendicular, or may be disposed in the optical device such that it is about 35 degrees to about 55 degrees or about 40 degrees to about 50 degrees or approximately about 45 degrees.

When the alignment direction of the alignment film is used as a reference, the alignment directions of the alignment films formed on each side of the two base films of the liquid crystal element disposed opposite to each other as described above may form, to each other, an angle in a range of about −10 degrees to about 10 degrees, an angle in a range of about −7 degrees to about 7 degrees, an angle in a range of about −5 degrees to about 5 degrees or an angle in a range of about −3 degrees to about 3 degrees, or in the case of being approximately parallel to each other, the angle formed by the alignment direction of any one of the two alignment films and the light absorption axis of the polarizer may be about 80 degrees to about 100 degrees or about 85 to about 95 degrees, or may be approximately perpendicular.

In another example, the alignment directions of the two alignment films may form an angle in a range of about 80 degrees to about 100 degrees, an angle in a range of about 83 degrees to about 97 degrees, an angle in a range of about 85 degrees to about 95 degrees or an angle in a range of about 87 degrees to about 92 degrees, or in the case of being approximately vertical to each other, the angle formed by the alignment direction of the alignment film disposed closer to the polarizer of the two alignment films and the light absorption axis of the polarizer may be about 80 degrees to about 100 degrees or about 85 degrees to about 95 degrees, or may be approximately perpendicular.

For example, as shown in FIG. 4, the active liquid crystal element (10) and the polarizer (20) may be disposed in a state of being laminated on each other such that the optical axis (average optical axis) of the first alignment direction in the active liquid crystal element (10) and the light absorption axis of the polarizer (20) become the above relationship.

In one example, when the polarizer (20) is a polarizing coating layer to be described below, a structure in which the polarizing coating layer is present inside the liquid crystal element can be realized. For example, as shown in FIG. 5, a structure in which the polarizing coating layer (201) is present between any one base film (110) of the base films (110) of the liquid crystal element and the active liquid crystal layer (120) can be realized. For example, the conductive layer, the polarizing coating layer (201) and the alignment film as described above may be sequentially formed on the base film (110).

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to about 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the active liquid crystal element and the polarizer as described above. Thus, the optical device may comprise only one active liquid crystal element and may comprise only one polarizer.

The optical device may further comprise two outer substrates disposed opposite to each other. In this specification, one of the two outer substrates may be referred to as a first outer substrate and the other may be referred to as a second outer substrate for the sake of convenience, but the first and second representations do not define the order or vertical relationship of the outer substrates. In one example, the polarizer included together with the active liquid crystal element may be encapsulated between the two outer substrates. Such encapsulation may be performed using an adhesive film. For example, as shown in FIG. 6, the active liquid crystal element (10) and the polarizer (20) may exist between the two outer substrates (30) disposed opposite to each other.

As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold; silver; or a silicon compound such as silicon dioxide or silicon monoxide, or a functional layer such as an antireflection layer may also be present on the outer substrate, if necessary.

As the outer substrate, a substrate having a phase difference in a predetermined range may be used. In one example, the outer substrate may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less. In another example, the front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of a thickness direction phase difference of the outer substrate may be, for example, about 200 nm or less. The absolute value of the thickness direction phase difference may be about 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less, and may be about 0 nm or more, 5 nm or more, 10 nm or more, 20 nm or more, 30 nm or more, 40 nm or more, 50 nm or more, 60 nm or more, 70 nm or more, or about 75 nm or more. The thickness direction phase difference may be negative, or may be positive, if the absolute value is within the above range, and for example, may be negative.

The front phase difference (Rin) and the thickness direction phase difference (Rth) of the outer substrate may be calculated in the same manner, except that in Equations 1 and 2 above, the thickness (d), the refractive index in the slow axis direction (nx), the refractive index in the fast axis direction (ny) and the refractive index in the thickness direction (nz), of the base film, are substituted with the thickness (d), the refractive index in the slow axis direction (nx), the refractive index in the fast axis direction (ny) and the refractive index in the thickness direction (nz), of the outer substrate, respectively, to calculate them.

When the outer substrate is optically anisotropic, the angle formed by the slow axes of the outer substrates disposed opposite to each other may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel.

Furthermore, the angle formed by the slow axis of the outer substrate and, in the case where the above-described base film is optically anisotropic, the slow axis of the base film may be, for example, in a range of about −10 degrees to about 10 degrees, in a range of about −7 degrees to about 7 degrees, in a range of about −5 degrees to about 5 degrees or in a range of about −3 degrees to about 3 degrees, or may be approximately parallel, or may be in a range of about 80 degrees to about 100 degrees, in a range of about 83 degrees to about 97 degrees, in a range of about 85 degrees to about 95 degrees or in a range of about 87 degrees to about 92 degrees, or may be approximately vertical.

It is possible to realize optically excellent and uniform transparent and black modes through the phase difference adjustment or the arrangement of the slow axes.

As the outer substrate, a substrate having a coefficient of thermal expansion of about 100 ppm/K or less may be used. In another example, the coefficient of thermal expansion may be about 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or about 15 ppm/K or less, or may be about 1 ppm/K or more, 2 ppm/K or more, 3 ppm/K or more, 4 ppm/K or more, 5 ppm/K or more, 6 ppm/K or more, 7 ppm/K or more, 8 ppm/K or more, 9 ppm/K or more, or about 10 ppm/K or more.

The methods of measuring the coefficient of thermal expansion and the elongation at break of the outer substrate are the same as the methods of measuring the coefficient of thermal expansion and elongation at break of the base film as described above.

By selecting the outer substrate to have such a coefficient of thermal expansion and/or elongation at break, an optical device having excellent durability can be provided.

The thickness of the outer substrate as above is not particularly limited, and for example, may be about 0.3 mm or more. In another example, the thickness may be about 0.5 mm or more, 1 mm or more, 1.5 mm or more, or about 2 mm or more or so, and may also be about 10 mm or less, 9 mm or less, 8 mm or less, 7 mm or less, 6 mm or less, 5 mm or less, 4 mm or less, or about 3 mm or less or so.

In another example, if the outer substrate is a curved surface substrate as described below, the thickness may be about 0.3 mm or more, 0.5 mm or more, or about 0.7 mm or more, while being about 1 mm or less, as long as it is applied to a suction or pressurization process as described below.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

In addition, here, in the case of having the curved surface shape at the same time, the respective curvatures or curvature radius may be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

Also, with respect to the substrate, for example, when the curvatures or the curvature radius at the front surface and the back surface are different from each other, the curvatures or curvature radius of the respective facing surfaces, that is, the curvature or curvature radius of the surface facing a second outer substrate in the case of a first outer substrate and the curvature or curvature radius of the surface facing the first outer substrate in the case of the second outer substrate, may be a reference. Furthermore, when the relevant surface has portions that the curvatures or curvature radius are not constant and different, the largest curvature or curvature radius, or the smallest curvature or curvature radius, or the average curvature or average curvature radius may be a reference.

Both of the substrates may have a difference in curvature or curvature radius within about 10%, within 9%, within 8%, within 7%, within 6%, within 5%, within 4%, within 3%, within 2% or within about 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the differences in curvatures or curvature radius of two outer substrates can be the same, the difference in curvature or curvature radius may be 0% or more, or more than 0%.

The control of such a curvature or curvature radius is useful in a structure in which an active liquid crystal element and/or a polarizer are encapsulated by an adhesive film as in the optical device of the present application.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

FIG. 7 is a side illustration that an encapsulation portion (400) comprising an active liquid crystal element exists between first and second outer substrates (30), where the center of the curvature in both the first and second outer substrates (30) exists at the lower part in the drawing.

The specific range of each curvature or curvature radius of the first and second outer substrates is not particularly limited. In one example, the curvature radius of each substrate may be about 100R or more, 200R or more, 300R or more, 400R or more, 500R or more, 600R or more, 700R or more, 800R or more, or about 900R or more, or may be about 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or about 1,050R or less. Here, R denotes a curved gradient of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radius in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

That is, for the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal element and/or polarizer, and bubbles may be formed inside.

However, when the curvatures or curvature radii between the substrates are controlled as described above, the net force which is the sum of the restoring force and the gravity may act to prevent the widening and also to withstand the same process pressure as the autoclave, even if the adhesion force by the adhesive film is lowered.

The optical device may further comprise an adhesive film encapsulating the active liquid crystal element and/or the polarizer in the outer substrates. For example, as shown in FIG. 8, the adhesive film (40) may be present between the outer substrate (30) and the active liquid crystal element (10), between the active liquid crystal element (10) and the polarizer (20) and/or between the polarizer (20) and the outer substrate (30), and may be present on the sides of the active liquid crystal element (10) and the polarizer (20), appropriately, on all sides.

The adhesive film may encapsulate the active liquid crystal element (10) and the polarizer (20) while attaching the outer substrate (30) and the active liquid crystal element (10), the active liquid crystal element (10) and the polarizer (20), and the polarizer (20) and the outer substrate (30) to each other.

For example, after laminating outer substrates, an active liquid crystal element, a polarizer and an adhesive film according to a desired structure, the above structure can be realized by a method of pressing them in a vacuum state.

As the adhesive film, a known material can be used without any particular limitation, and for example, among a known thermoplastic polyurethane adhesive film (TPU: thermoplastic polyurethane), TPS (thermoplastic starch), polyamide adhesive film, acrylic adhesive film, polyester adhesive film, EVA (ethylene vinyl acetate) adhesive film, polyolefin adhesive film such as polyethylene or polypropylene, or polyolefin elastomer film (POE film), and the like, one satisfying physical properties to be described below can be selected.

As the adhesive film, a film having a phase difference in a predetermined range may be used. In one example, the adhesive film may have a front phase difference of about 100 nm or less. In another example, the front phase difference may be about 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, 5 nm or less, 4 nm or less, 3 nm or less, 2 nm or less, or about 1 nm or less. The front phase difference may be about 0 nm or more, 1 nm or more, 2 nm or more, 3 nm or more, 4 nm or more, 5 nm or more, 6 nm or more, 7 nm or more, 8 nm or more, 9 nm or more, or about 9.5 nm or more.

An absolute value of the thickness direction phase difference of the adhesive film may be, for example, about 200 nm or less. In another example, the absolute value may be about 190 nm or less, 180 nm or less, 170 nm or less, 160 nm or less, 150 nm or less, 140 nm or less, 130 nm or less, 120 nm or less, or about 115 nm or less, or may be about 0 nm or more, 10 nm or more, 20 nm or more, 30 nm or more, 40 nm or more, 50 nm or more, 60 nm or more, 70 nm or more, 80 nm or more, or about 90 nm or more. If the thickness direction phase difference has an absolute value in the above range, it may be negative, or may be positive, and for example, it may be negative.

The front phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz), of the base film, are substituted with the thickness (d), the refractive index in the slow axis direction (nx), the refractive index in the fast axis direction (ny) and the refractive index in the thickness direction (nz), of the adhesive film, respectively, to calculate them.

As the adhesive film, one having a Young's modulus in a range of 0.1 to 100 MPa may be used. The Young's modulus may be measured in accordance with ASTM D882 standard, and may be measured by tailoring the film in the form provided by the corresponding standard and using equipment capable of measuring stress-strain curve (capable of simultaneously measuring force and length).

By selecting the adhesive film to have such a Young's modulus, an optical device with excellent durability can be provided.

The thickness of such an adhesive film is not particularly limited, which may be, for example, in a range of about 200 μm to 600 μm or so. In another example, here, the thickness of the adhesive film may be a thickness of the adhesive film between the outer substrate (30) and the active liquid crystal element (10), such as an interval between the two, a thickness of the adhesive film between the active liquid crystal element (10) and the polarizer (20), such as an interval between the two, and a thickness of the adhesive film between the polarizer (20) and the outer substrate (30), such as an interval between the two.

The optical device may further comprise a buffer layer. Such a buffer layer may be present on one side or both sides of the liquid crystal element. FIG. 9 shows a structure in which the buffer layer (50) is present on both sides of the active liquid crystal element (10), but the buffer layer (50) may also be present only on one side of the active liquid crystal element (10).

Such a buffer layer can mitigate the negative pressure caused by the difference in the coefficient of thermal expansion between layers in a structure in which the active liquid crystal element is encapsulated by an adhesive film, and enable so that a more durable device can be realized.

In one example, as the buffer layer, a layer having a Young's modulus of 1 MPa or less may be used. In another example, the Young's modulus of the buffer layer may be about 0.9 MPa or less, 0.8 MPa or less, 0.7 MPa or less, 0.6 MPa or less, 0.6 MPa or less, 0.1 MPa or less, 0.09 MPa or less, 0.08 MPa or less, 0.07 MPa or less, or about 0.06 MPa or less. In another example, the Young's modulus is about 0.001 MPa or more, 0.002 MPa or more, 0.003 MPa or more, 0.004 MPa or more, 0.005 MPa or more, 0.006 MPa or more, 0.007 MPa or more, 0.008 MPa or more, 0.009 MPa or more, 0.01 MPa or more, 0.02 MPa or more, 0.03 MPa or more, 0.04 MPa or more, or about 0.045 MPa or more. Here, the measurement method of the Young's modulus is the same as the above-mentioned measuring method of the adhesive film.

As a specific kind of the buffer layer, a transparent material showing the above-mentioned Young's modulus may be used without particular limitation, and for example, an acrylate-based, urethane-based, rubber-based or silicon-based oligomer or polymer material, and the like can be used.

The thickness of the buffer layer is not particularly limited, which may be selected within a range that can effectively reduce the negative pressure generated inside the device by exhibiting the Young's modulus in the above range.

The optical device may further comprise any necessary configuration other than the above configurations, and for example, comprise a known configuration such as a retardation layer, an optical compensation layer, an antireflection layer or a hard coating layer in a proper position.

The present application relates to a method for manufacturing such an optical device. Therefore, in the following description, the details of the structure or design, and parts of the optical device follow the above-described contents.

The manufacturing method of the present application is effectively applied particularly when the first and/or second outer substrate in the structure of the optical device is a curved surface substrate.

That is, the manufacturing method of the present application relates to a manufacturing method of an optical device in which at least one outer substrate in the structure of the above-described optical device is a curved surface substrate.

For example, the manufacturing method of the present application is a method for manufacturing an optical device which comprises: a first outer substrate which is a curved surface substrate; a second outer substrate disposed opposite to the first outer substrate; and the active liquid crystal element or the polarizer encapsulated by an encapsulating agent (the adhesive film) between the first and second outer substrates.

The manufacturing method of the present application may comprise a first step of holding the first outer substrate, which is a curved surface substrate, in a planar state by suction or pressurization. Here, the planar state is a state where the curvature of the first outer substrate is kept smaller than the initial state, and thus a state where the curvature is reduced to close to the planar state as well as an ideal planar state is included in the planar state.

Here, the method of holding the first outer substrate in a planar state by suction or pressurization is not particularly limited. For example, as shown in FIG. 10, the suction may be performed by disposing the curved surface substrate (301) on a suction device (e.g. suction stage) (302) and suctioning it.

As shown in the drawing, in the suction process, the surface opposite to the surface of the curved surface substrate on which a convex portion is formed can be suctioned.

The pressure at the time of suction can be appropriately set in consideration of the desired planar state, the curvature, thickness and area of the curved surface substrate, and the like, where the specific range thereof is not particularly limited. For example, the suction may be performed at a pressure of, typically, about −760 mmHg or less, or more than that or the above pressure level, and in another example, it may be performed at a pressure of about −700 mmHg to about −760 mmHg, but is not limited thereto.

The method of performing the pressurizing process in the first step is also not particularly limited. For example, the pressurization can be performed by pressurizing the curved surface substrate with a normal pressure roll. The pressurization can be performed on the convex surface of the curved surface substrate. The pressure at the time of pressurization can be appropriately set in consideration of the desired planar state, the curvature, thickness and area of the curved surface substrate, and the like, and the specific range thereof is not particularly limited. For example, the pressurization can be performed at a pressure in the range of about 0.6 Kg/cm$^2$ to about 1.2 Kg/cm$^2$.

In one example, as shown in FIG. 11, the pressurization can be performed by disposing a flexible film (200) on the surface of the curved surface substrate (301) on which the convex portion is formed, and pressurizing the flexible film with a pressure roll. Through this process, more efficient pressurization can be performed. The planar state can be maintained by applying suitable tensile force to the flexible film simultaneously with the pressurization. Here, the method of performing the pressurization is not particularly limited, and it may be performed by using, for example, a pressurizing means (2001) such as a laminating roll as shown in FIG. 11.

The kind of the flexible film applied in the above process is not particularly limited as long as it has a flexible property, and for example, a silicone film, a TPU (thermoplastic polyurethane) film, a TAC (triacetyl cellulose) film; a COP (cycloolefin copolymer) film such as a norbornene derivative; an acrylic film such as PMMA (poly(methyl methacrylate)); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketon) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film, and the like may be used, without being limited thereto.

The holding of the curved surface substrate in the planar state can be performed through at least one process of the suction and the pressurization, which can be performed by a process including at least a suction process for maintaining the planar state, and in one example, it may proceed by performing both of the suction and the pressurization.

In the manufacturing method, following the first step, a second step of attaching the active liquid crystal element or the polarizer to one side of the first outer substrate, which is maintained in the planar state, via an encapsulating agent may be further performed.

Here, the above-described adhesive film may be used as the encapsulating agent. Furthermore, the structure of the active liquid crystal element and/or the polarizer to be attached is not particularly limited and is determined depending on the structure of the desired optical device.

For example, if an optical device having the structure as shown in FIG. 8 is desired, the laminated structure of the adhesive film/active liquid crystal element (10)/adhesive film/polarizer (20) can be attached.

The method for performing the second step is not particularly limited, which can be performed, for example, by applying a known lamination technique.

An optical device may be manufactured by attaching a second outer substrate on the active liquid crystal element or polarizer attached after performing the second step, via an encapsulating agent. At this time, when the second outer substrate is a plane substrate, it may be attached in a state of maintaining the planar state of the first outer substrate, and when the second outer substrate is a curved surface substrate, it may be attached after the planar state of the first outer substrate is released, as shown in FIG. 12. That is, FIG. 12 schematically shows a case where the planar state is released in a state that an element (1203) such as an active liquid crystal element and/or a polarizer is attached to the first outer substrate (1201) maintained in the planar state via an adhesive film (1202), and a second outer substrate (1204) is attached to the surface thereof via an adhesive film (1202). The attachment of the second outer substrate can be performed by the encapsulating agent, that is, the adhesive film, where the adhesive film may be first attached to the second outer substrate and then attached to the upper part of the active liquid crystal element or the like, or the adhesive film may be formed on the upper part of the element (1203) such as the active liquid crystal element and then attached to the second outer substrate.

The attachment of the second outer substrate may also be performed by applying a known lamination technique.

Accordingly, the manufacturing method of the optical device may comprise a third step of releasing the suction or pressurization state of the curved surface substrate to which the active liquid crystal element or the polarizer is attached to return the first outer substrate to the curved surface state; and a fourth step of attaching a second outer substrate through an encapsulating agent to the upper part of the active liquid crystal element or the polarizer attached to one side of the first outer substrate.

In one example, the attachment of the fourth step may be performed in a state where the first outer substrate that the curved surface state is released is positioned on a curved surface having a curvature. FIG. 13 schematically shows a case where the attachment is performed in a state in which the first outer substrate (1201) is positioned on the curved surface (1301).

Here, the curvature of the curved surface on which the first outer substrate is located is suitably as similar as possible to the curvature of the first outer substrate, and for example, the difference in curvature or curvature radius between the first outer substrate and the curved surface may be within about 10%, within 9%, within 8%, within 7%, within 6%, within 5%, within 4%, within 3%, within 2% or within about 1%. When a large curvature or curvature radius is $C_L$ and a small curvature or curvature radius is $C_S$, the difference in curvature or curvature radius is a value calculated by $100\times(C_L-C_S)/C_S$. In addition, the lower limit of the difference in curvature or curvature radius is not particularly limited. Since the differences in curvatures or curvature radius of the first outer substrate and the curved surface can be the same, the difference in curvature or curvature radius may be 0% or more, or more than 0%.

Following such steps, the encapsulation can be completed through a suitable laminating process, for example, an autoclave process.

The conditions of the autoclave process are not particularly limited, and it can be performed under an appropriate temperature and pressure, for example, depending on the kind of the applied adhesive film. The typical autoclave process has a temperature of about 80° C. or more, 90° C. or more, or about 100° C. or more, and a pressure of 2 atm or more, without being limited thereto. The upper limit of the process temperature may be about 200° C. or less, 190° C. or less, 180° C. or less, or about 170° C. or less or so and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including a body in which at least one opening is formed, the optical device or the sunroof for a vehicle attached to the opening can be mounted and used.

At this time, when the curvatures or curvature radius of the outer substrates are different from each other, a substrate having a smaller curvature radius, that is, a substrate having a larger curvature, can be arranged in the gravity direction.

MODE FOR INVENTION

The present application will be described in detail by way of examples and comparative examples, but the scope of the present application is not limited to the following examples.

Example 1

An optical device was produced by encapsulating a guest-host liquid crystal device (cell gap: about 12 μm, base film type: PET (poly(ethylene terephthalate) film), liquid crystal/dye mixture type: mixture of MAT-16-969 liquid crystals from Merck and a dichroic dye (BASF, X12)) as an active liquid crystal element and a PVA (polyvinyl alcohol)-based polarizer between two outer substrates with thermoplastic polyurethane adhesive films (thickness: about 0.38 mm, manufacturer: Argotec Co., Ltd., product name: ArgoFlex).

Here, as the outer substrates, glass substrates having a thickness of about 3 mm or so were used, where a substrate having a curvature radius of about 1030R (first outer substrate) and a substrate having a curvature radius of 1000R (second outer substrate) were used.

First, as shown in FIG. 10, the first outer substrate was placed on a suction device (suction stage) such that the surface, on which a convex portion was formed, faced upward and then a silicone film was disposed thereon, as shown in FIG. 11, and the suction shown FIG. 10 and the pressurization shown in FIG. 11 were simultaneously performed to planarize the first outer substrate. In the process, the pressure at the time of suction was in the range of about −0.09 MPa to −0.1 MPa or so, and the pressurized pressure was maintained at a level of about 0.8 Kg/cm$^2$ or so.

Thereafter, a laminate, in which the adhesive film, the active liquid crystal element, the adhesive film and the polarizer were sequentially laminated, was laminated on the planarized first outer substrate such that the active liquid crystal element was located closer to the first outer substrate than the polarizer. Subsequently, the suction pressure was released to release the planar state as shown in FIG. 12. Then, a laminate, in which the adhesive film was previously attached to the side opposite to the convex surface of the second outer substrate, was attached on the polarizer via the adhesive film.

Thereafter, the optical device was produced by performing an autoclave process at a temperature of about 100° C. and a pressure of about 2 atm or so.

Thereafter, the produced optical device was evaluated for occurrence of dark spots, wrinkles, dimples and waviness, and as a result, it could be confirmed that the optical device of stable quality was produced, without observing any dark spot, wrinkle, dimple and waviness.

Example 2

An optical device was produced in the same manner as in Example 1, except that when attaching the second outer substrate, it was performed in a state where the first outer substrate (1201) was placed on a curved surface (1301) having the same curvature as its curvature, as shown in FIG. 13, and the autoclave process proceeded.

Thereafter, the produced optical device was evaluated for occurrence of dark spots, wrinkles, dimples and waviness, and as a result, it could be confirmed that the optical device of stable quality was produced, without observing any dark spot, wrinkle, dimple and waviness.

The invention claimed is:

1. A method for manufacturing an optical device comprising a first outer substrate having a curved surface substrate, a second outer substrate disposed opposite to the first outer substrate, and an active liquid crystal element or a polarizer encapsulated by an encapsulating agent between the first and second outer substrates, the method comprising:

holding the first outer substrate in a planar state by suction or pressurization at a convex portion of the curved surface substrate;

attaching the active liquid crystal element or the polarizer to one side of the first outer substrate held in the planar state via the encapsulating agent, wherein the active liquid crystal element comprises two base films disposed opposite to each other and an active liquid crystal layer between the two base films, wherein the encapsulating agent is placed between the first outer substrate and the active liquid crystal element or the polarizer and is placed on sides of the active liquid crystal element or the polarizer;

releasing the suction or pressurization of the curved surface substrate, to which the active liquid crystal element or the polarizer is attached, to return the first outer substrate to a curved surface state; and attaching the second outer substrate through the encapsulating agent to an upper part of the active liquid crystal element or the polarizer attached to the one side of the first outer substrate under a state where the suction or pressurization is released and the first outer substrate is returned to the curved surface state, wherein the second outer substrate is a curved surface substrate and wherein the encapsulating agent encapsulates the active liquid crystal element or the polarizer and is disposed between the second outer substrate and the active liquid crystal element or the polarizer.

2. The method for manufacturing the optical device according to claim 1, wherein a difference in curvature of the first and second outer substrates is 10% or less.

3. The method for manufacturing the optical device according to claim 1, wherein the first and second outer substrates are glass substrates.

4. The method for manufacturing the optical device according to claim 1, wherein the first and second outer substrates have curvatures different from each other.

5. The method for manufacturing the optical device according to claim 1, wherein a curvature radius having a large curvature in the first and second outer substrates is in a range of 100R to 10,000R.

6. The method for manufacturing the optical device according to claim 1, wherein curvature centers of the first and second outer substrates in the optical device are present in a same part of an upper part or a lower part of the first and second outer substrates.

7. The method for manufacturing the optical device according to claim 1, wherein the active liquid crystal element comprises a liquid crystal host and a dichroic dye guest, and the active liquid crystal element has an active liquid crystal layer capable of switching between a first orientation state and a second orientation state.

8. The method for manufacturing the optical device according to claim 1, wherein the active liquid crystal element and the polarizer in the optical device are encapsulated between the first and second outer substrates.

9. The method for manufacturing the optical device according to claim 8, wherein the active liquid crystal element and the polarizer in the optical device are encapsulated with an adhesive film present between one of the first or second outer substrates and the active liquid crystal element, between the active liquid crystal element and the polarizer, between the polarizer and one of the first or second outer substrate and on sides of the active liquid crystal element and the polarizer.

10. The method for manufacturing the optical device according to claim 9, wherein the adhesive film is a thermoplastic polyurethane adhesive film, a polyamide adhesive film, an acrylic adhesive film, a polyester adhesive film, an EVA (ethylene vinyl acetate) adhesive film, a polyolefin adhesive film or thermoplastic starch (TPS).

11. The method for manufacturing the optical device according to claim 1, wherein in the holding of the first outer substrate in the planar state by suction, a surface opposite to a surface of the curved surface substrate on which the convex portion is formed is sucked.

12. The method for manufacturing the optical device according to claim 1, wherein the suction in the holding of the first outer substrate in the planar state by suction is performed at a pressure of −760 mmHg or less.

13. The method for manufacturing the optical device according to claim 1, wherein the pressurization in the holding of the first outer substrate in the planar state by pressurization is performed at a pressure in a range of 0.6 Kg/cm$^2$ to 1.2 Kg/cm$^2$.

14. The method for manufacturing the optical device according to claim 1, wherein the pressurization in the holding of the first outer substrate in the planar state by pressurization is performed by disposing a flexible film on a surface of the curved surface substrate on which the convex portion is formed, and pressurizing the flexible film with a pressure roll.

15. The method for manufacturing the optical device according to claim 1, wherein the pressurization and the suction in the holding of the first outer substrate in the planar state by suction or pressurization are simultaneously performed to maintain the planar state of the curved surface substrate.

16. The method for manufacturing the optical device according to claim 1, wherein the attaching of the second outer substrate is performed in a state where the first outer substrate is positioned on a curved surface having a curvature.

17. The method for manufacturing the optical device according to claim 16, wherein a difference between a curvature of the first outer substrate and a curvature of the curved surface is 10% or less.

* * * * *